(12) United States Patent
Ninomiya

(10) Patent No.: US 7,620,805 B2
(45) Date of Patent: Nov. 17, 2009

(54) APPARATUS FOR UPDATING PROGRAM IN A FUEL CELL UNIT

(75) Inventor: Ryoji Ninomiya, Tachikawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 499 days.

(21) Appl. No.: 11/528,559

(22) Filed: Sep. 28, 2006

(65) Prior Publication Data

US 2007/0020493 A1     Jan. 25, 2007

(51) Int. Cl.
G06F 1/24     (2006.01)
(52) U.S. Cl. .......................................... 713/100; 713/2
(58) Field of Classification Search ................ 713/2, 713/100; 429/22
See application file for complete search history.

(56) References Cited

U.S. PATENT DOCUMENTS

| | | | | |
|---|---|---|---|---|
| 4,949,046 | A * | 8/1990 | Seyfang | 324/427 |
| 5,260,885 | A * | 11/1993 | Ma | 361/679.26 |
| 6,029,119 | A * | 2/2000 | Atkinson | 702/132 |
| 6,286,109 | B1 * | 9/2001 | Pirdy | 713/340 |
| 6,326,097 | B1 * | 12/2001 | Hockaday | 429/34 |
| 6,383,670 | B1 * | 5/2002 | Edlund et al. | 429/20 |
| 6,387,556 | B1 * | 5/2002 | Fuglevand et al. | 429/22 |
| 6,522,955 | B1 * | 2/2003 | Colborn | 700/286 |
| 6,543,008 | B1 | 4/2003 | Ninomiya | |
| 7,222,001 | B2 * | 5/2007 | Frost et al. | 700/286 |
| 2003/0224224 | A1 | 12/2003 | Okada et al. | |
| 2004/0081867 | A1 * | 4/2004 | Edlund | 429/22 |
| 2004/0207267 | A1 * | 10/2004 | Ozeki et al. | 307/150 |
| 2004/0212345 | A1 | 10/2004 | Ozeki et al. | |

FOREIGN PATENT DOCUMENTS

| | | |
|---|---|---|
| JP | 2002-73359 | 3/2002 |
| JP | 2002-169629 | 6/2002 |
| JP | 2003-142137 | 5/2003 |
| JP | 2003-229160 | 8/2003 |
| JP | 2003-346823 | 12/2003 |

OTHER PUBLICATIONS

International Preliminary Report on Patentability and Written Opinion issued by the International Bureau of WIPO on Oct. 19, 2006, for International Patent Application No. PCT/JP2005/005275.
"Fuel Cell 2004 (Nenryou-Denchi 2004)" Nikkei Business Publications, Inc., pp. 49-50, 64, (Oct. 2003).
Ikeda, "Everything of Fuel Cell (Nenryoudenchi-no-subete)", Nippon Jitsugyo Publishing Co., Ltd., pp. 209-213, (Aug. 2001).

* cited by examiner

*Primary Examiner*—Chun Cao
(74) *Attorney, Agent, or Firm*—Finnegan, Henderson, Farabow, Garrett & Dunner, L.L.P.

(57) ABSTRACT

An information processing apparatus, to which a fuel cell unit having a fuel cell and a storage unit is connectable, the information processing apparatus comprises: an input unit for externally inputting a program; and a control unit for performing communication with the fuel cell unit. The program inputted via the input unit is transmitted to the fuel cell unit and stored in the storage unit. According to the configuration described above, control programs for fuel cell units can be easily updated.

18 Claims, 9 Drawing Sheets

APPARATUS FOR UPDATING PROGRAM IN A FUEL CELL UNIT

CROSS-REFERENCE TO RELATED APPLICATION

This application is based upon and claims the benefit of priority from PCT application No. PCT/JP2005/005275 filed Mar. 23, 2005 and Japanese Patent Application No. 2004-108044, filed Mar. 31, 2004, the entire contents of which are incorporated herein by reference.

BACKGROUND

1. Field

The present invention relates to an information processing apparatus, a fuel cell unit and a program updating method thereof, and particularly relates to an information processing apparatus having a fuel unit, a fuel cell unit and a program updating method thereof.

2. Description of the Related Art

Currently, lithium ion batteries and the like are used as secondary cells, which is a type of electric power supply source for information processing apparatuses. One feature of secondary cells is the ability to be repeatedly charged and reused by means of a commercial power source, which is a feature that disposable primary cells do not have. Accordingly, lithium ion batteries need to be charged using such a commercial power source, being a secondary cell.

Also, the improvement in capabilities of information processing apparatuses in recent years has been tremendous, and accordingly the electric power consumption of information processing apparatuses is on the rise. Efforts are being made to increase the density of energy which lithium ion batteries provide as electric power to the information processing apparatuses, i.e., the amount of output energy per unit volume or per unit mass, but marked improvement thereof is unlikely.

On the other hand, the energy density of fuel cells is said to be logically calculated to be ten times that of lithium ion batteries (e.g., see "Fuel Cell 2004 (Nenryou-Denchi 2004)" Nikkei Business Publications, Inc., pp. 49-50 and pp. 64, October 2003). This means that a fuel cell has the potential to supply electric power for longer time (e.g., ten times) with the same volume or mass. Conversely, a fuel cell has the potential to supply electric power for the same amount of time with a far smaller and lighter cell than a lithium ion battery.

Also, a fuel cell can be formed into a unit wherein fuel such as methanol or the like is sealed in a small container, with this small container being replaced whenever necessary, meaning that there is no need for external charging. Accordingly, information processing apparatuses such as notebook computers can be used for far longer periods of time by obtaining electric power using the fuel cell as compared with lithium ion batteries in situations where there are no AC power facilities. In other words, using lithium ion batteries places restrictions on using such information processing apparatuses, either on the amount of time of continuous use, or on the environment, since using for long periods of time requires availability of an AC power source.

In light of the above, research and development of fuel cells for supplying electric power to information processing apparatuses is being carried out, as disclosed in, for example, JP-A 2003-142137 and JP-A 2002-169629.

While there are various types of fuel cells (e.g., see "Everything of Fuel Cell (Nenryoudenchi-no-subete)," Hironosuke Ikeda, Nippon Jitsugyo Publishing Co., Ltd., August 2001), the Direct Methanol Fuel Cell (DMFC) type is a suitable candidate for use with information processing apparatuses, from the perspective of size, weight, and further, ease of handling the fuel. This type of fuel cell uses methanol for fuel, and the methanol does not have to be converted into hydrogen but is directly injected to the fuel electrode.

With Direct Methanol Fuel Cells, the concentration of the methanol injected to the fuel electrode is crucial, and in the event that the concentration is high the generating efficiency is poor and sufficient capabilities cannot be obtained. This is due to a phenomenon called "crossover" wherein a part of the methanol serving as fuel permeates a electrolytic film (solid polymer electrolytic membrane) between the fuel electrode (negative electrode) and air electrode (positive electrode). This crossover phenomenon becomes marked in the event that the methanol is highly concentrated, and is reduced in the event that low-concentration methanol is injected to the fuel electrode.

On the other hand, while using low-concentration methanol as fuel readily yields high performance, the volume of fuel becomes greater than cases of using high-concentration methanol (e.g., ten times), so the fuel storage container (fuel cartridge) is large in size.

An arrangement can be made to deal with this problem, wherein high-concentration methanol is stored in the fuel cartridge to reduce the size of the cartridge, and at the same time using small-sized pumps, valves, etc., for recirculation of water generated at the time of generating electricity so as to reduce the concentration of the high-concentration methanol before injecting to the fuel cell, thereby reducing the crossover phenomenon and improving electric power generating efficiency. In the following description, the pumps, valves, etc., used for recirculation will be referred to as "auxiliaries", and this system for recirculation of the water will be referred to as "dilution-recirculation system".

Such an approach (as disclosed in "Fuel Cell 2004 (Nenryou-Denchi 2004)" Nikkei Business Publications, Inc., pp. 49-50 and pp. 64, October 2003) can achieve a compact, lightweight fuel-cell unit having high power-generation efficiency.

Information processing apparatuses having fuel cell units, particularly portable type information processing apparatuses which do not receive supply of electric power from commercial power sources, are capable of operating for longer hours than those using secondary cells of the electric power source.

However, information processing apparatuses having fuel cell units need control specially for the fuel cell unit. For example, in order to obtain predetermined generating efficiency, the amount and concentration of fuel injected to the fuel cell, or the amount of air (oxygen), needs to be suitably controlled by driving multiple auxiliaries.

Further, it is important to monitor information of the fuel cell unit, such as fuel cell unit identification information, identification information of the fuel itself, information regarding the amount of fuel remaining, and so forth, and to provide this information to the user of the information processing apparatus, for example.

Controlling the auxiliaries, monitoring the information, and the like, can be effectively realized by a control method wherein a control program is executed by a micro-computer, for example.

Generally, with a system using software such as control programs or the like, the functions and performance of the overall system can be improved by changing the software alone, without changing the hardware. Also, cases can be conceived wherein the type of fuel itself used for the fuel cell unit is changed in order to improve the electric power generating efficiency, which could lead to the need to change the identification information of the fuel itself which the control program holds.

Though various methods can be conceived for changing the control program, a system wherein the user of the information processing apparatus obtains an updating control program via an electric communication line such as the Internet or the like, and installs the control program himself/herself, would be extremely handy for the user.

Also, with information processing apparatuses having fuel cell units, the fuel cell unit itself cannot be controlled while updating the control program for the fuel cell unit. Accordingly, there is the need to obtain electric power necessary for updating the control program other than from the electricity generated by the fuel cell unit, since the fuel cell unit needs to stop generating electricity before updating the control program.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Figure 1:
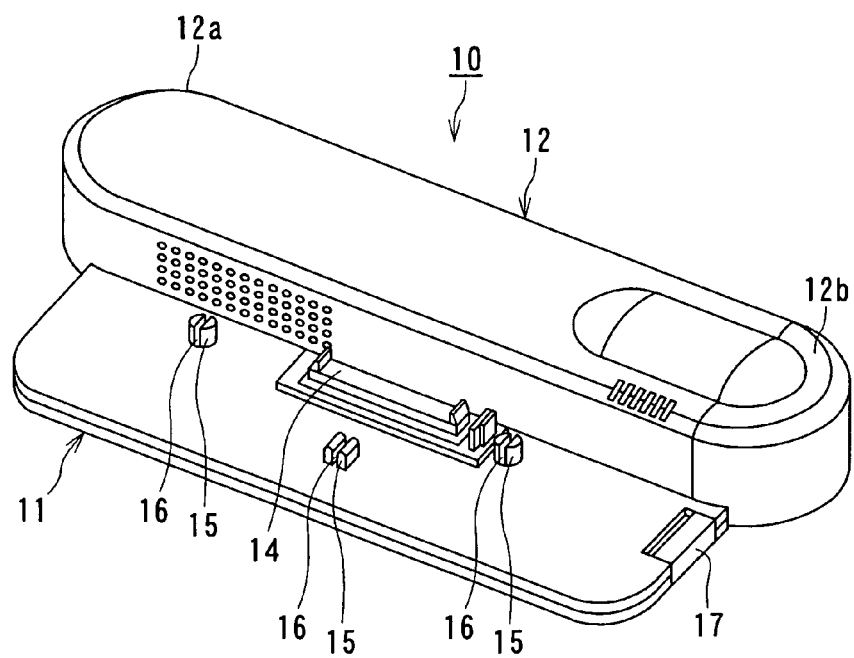
FIG. 1 is an external view illustrating an embodiment of a fuel cell unit which is a component of the information processing apparatus according to the present invention.

FIG. 1 is a perspective view illustrating an embodiment of a fuel cell unit 10 which is a component of an information processing apparatus 1 according to the present invention. As shown in FIG. 1, the fuel cell unit 10 is made up of a placing unit 11 for placing the rear portion of an information processing apparatus main unit, such as a notebook personal computer, and a fuel cell unit main unit 12. Built into the fuel cell unit main unit 12 are a DMFC stack configured by stacking increments (cells) of fuel cells (DMFC) which generate electricity by electrochemical reaction, auxiliaries for injecting methanol which is the fuel and air to the DMFC stack, recirculation, and so forth.

Also, a fuel cartridge (not shown) is detachably built into a unit case 12a of the fuel cell unit main unit 12 on the right side, for example, whereby the fuel cartridge can be detached from the unit case 12a of the fuel cell unit main unit 12 and replaced.

Figure 2:
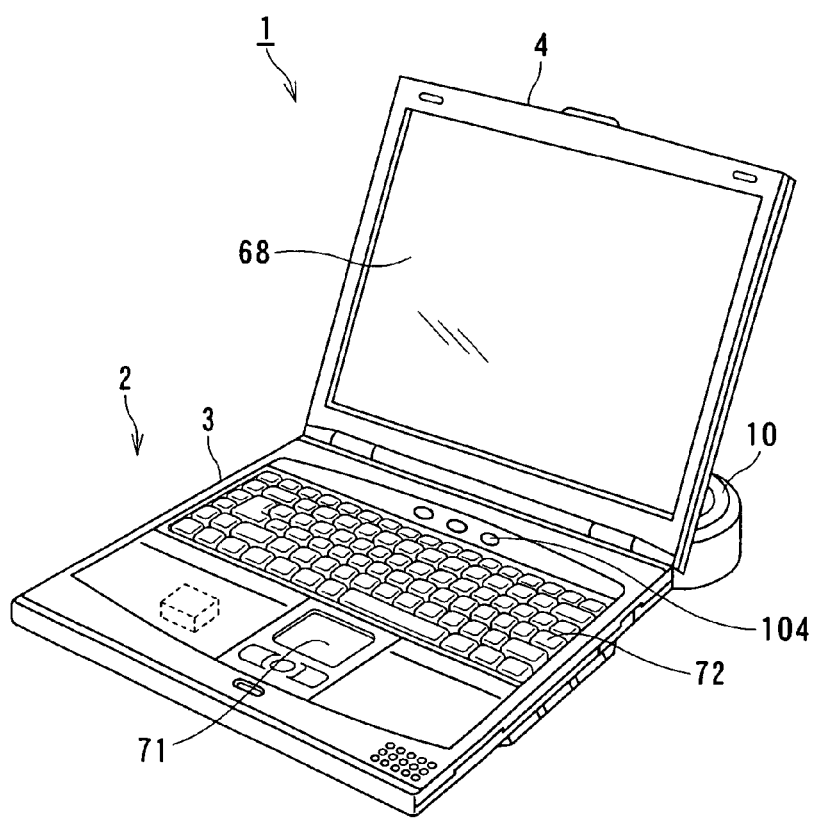
FIG. 2 is an external view illustrating an embodiment of an information processing apparatus according to the present invention.

An information processing apparatus main unit 2 shown in FIG. 2 is placed on the placing unit 11. A docking connector 14 is provided to the upper face of the placing unit 11, to serve as a connection unit for connecting to the information processing apparatus main unit 2. On the other hand, a docking connector (not shown) is provided to the back bottom portion for example of the information processing apparatus main unit 2 to serve as a connection unit for connecting to the fuel cell unit 10, whereby mechanical and electric connection is made with the docking connector 14 of the fuel cell unit 10. Also, three positioning protrusions 15 and hooks 16 are provided on the placing unit 11, and the positioning protrusions 15 and hooks 16 are inserted into three holes provided on the back bottom portion of the information processing apparatus main unit 2.

At the time of removing the information processing apparatus main unit 2 from the fuel cell unit 10, an unshown lock mechanism is disengaged by pressing an eject button 17 on the fuel cell unit 10 shown in FIG. 1, whereby the information processing apparatus main unit 2 can be easily removed from the fuel cell unit 10.

FIG. 2 is a diagram illustrating an external view of the information processing apparatus main unit 2 (e.g., notebook personal computer) being placed on and connected to the placing unit 11 of the fuel cell unit 10. The information processing apparatus main unit 2 is configured of a main body 3 and a panel unit 4 which opens and closes. The panel unit 4 has a display 68 formed of an LCD (Liquid Crystal Display), for example.

Also, disposed on the upper face of the main body 3 are a pointing device 71, keyboard 72, electric power switch 104, and so forth.

It should be noted that the shape and size of the information processing apparatus main unit 2 and the fuel cell unit 10 is not restricted to those shown in FIGS. 1 and 2, rather, various shapes and sizes can be conceived. In the same way, the shape and size of the docking connector 14 may vary.

Further, the fuel cell unit 10 may be arranged so as to be configured integrally with the information processing apparatus main unit 2 rather than connected through docking connectors 14 and 21.

Figure 3:
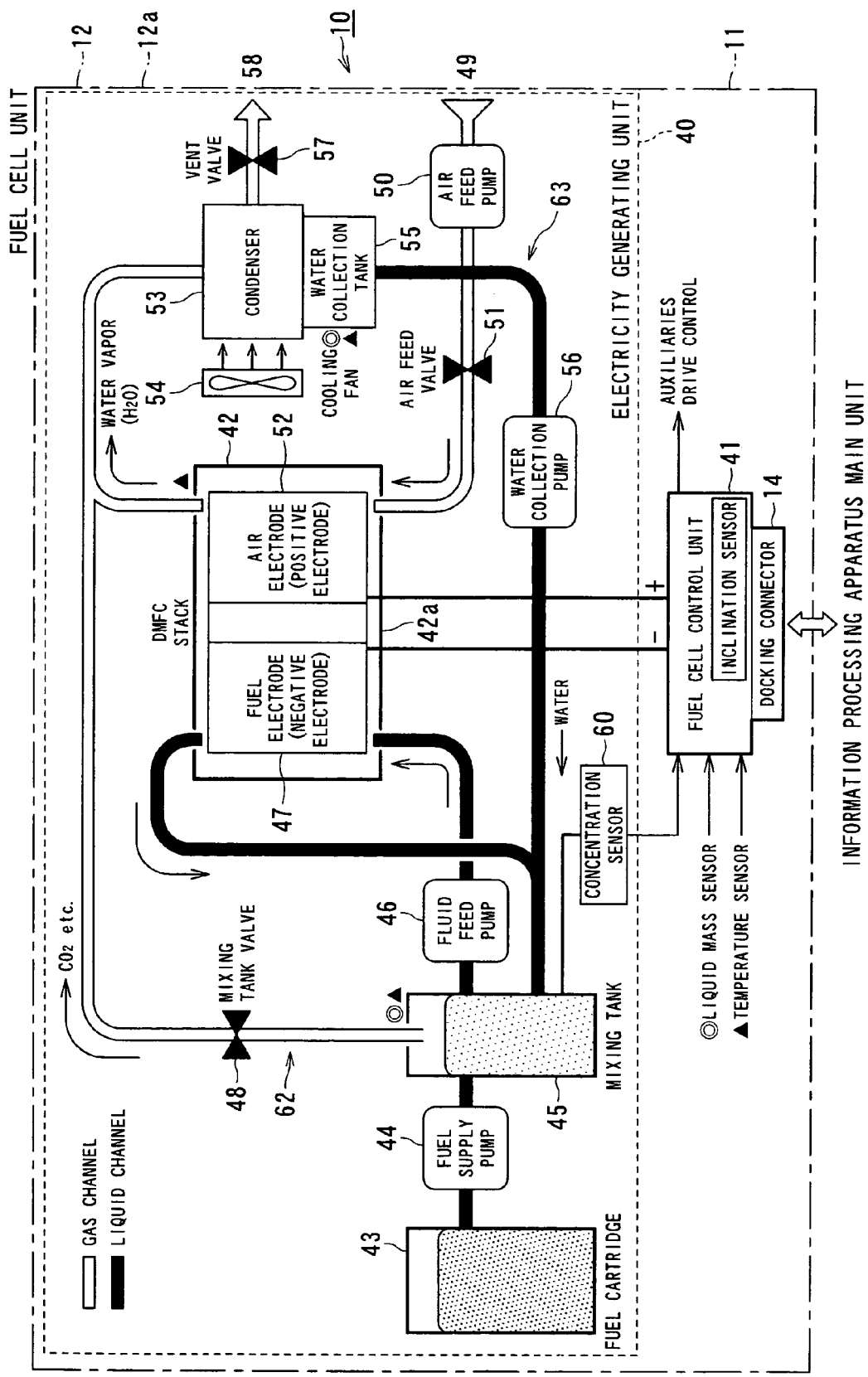
FIG. 3 is a diagram illustrating the fuel cell unit, and in particular the configuration of an electric power generating unit.

FIG. 3 illustrates the configuration of the fuel cell unit 10, particularly with regard to the DMFC stack and the auxiliaries disposed nearby, making up the electricity generating mechanism. The fuel cell unit 10 is configured of an electricity generating unit 40 and a fuel cell control unit 41. The fuel cell control unit 41 controls the electricity generating unit 40, and also has functions for communication control so as to perform communication with the information processing apparatus main unit 2.

The electricity generating unit 40 comprises a DMFC stack 42 which is central in generating electricity, and also a fuel cartridge 43 for storing methanol which is the fuel. High-concentration methanol is sealed into the fuel cartridge 43. The fuel cartridge 43 is detachable, so as to be readily replaced once the fuel is spent.

Also, with Direct Methanol Fuel Cells, there generally is the need to reduce crossover in order to improve electricity generating efficiency. Accordingly, the high-concentration methanol needs to be diluted to a low concentration and injected to the fuel electrode 47. The fuel cell unit 10 employs a dilution-recirculation system 62 to this end, and auxiliaries 63 necessary for realizing the dilution-recirculation system 62 are provided to the electricity generating unit 40.

The auxiliaries 63 can be divided into those provided in the liquid channel and those provided in the gas channel.

The connection of the auxiliaries 63 provided in the liquid channel involve a fuel supply pump 44 being connected to the output of the fuel cell cartridge 43, with the output of the fuel supply pump 44 being connected to a mixing tank 45. Further, the output of the mixing tank 45 is connected to a feed pump 46, and the output of the feed pump 46 is connected to the fuel electrode 47 of the DMFC stack 42. The output of the fuel electrode 47 is connected to the mixing tank 45. Also, the output of a water collection tank 55 is connected to a water collection pump 56, and the water collection pump 56 is connected to the mixing tank 45.

On the other hand, in the gas channel, an air feed pump 50 is connected to the air electrode 52 of the DMFC stack 42 via an air feed valve 51. The output of the of the air electrode 52 is connected to a condenser 53. Also, the mixing tank 45 is also connected to the condenser 53 via a mixing tank valve 48. The condenser 53 is connected to a vent 58 via a vent valve 57. A cooling fan 54 is disposed near the condenser 53.

Next, the electricity generating mechanism of the electricity generating unit 40 of the fuel cell unit 10 will be described following the flow of fuel and air (oxygen).

First, the high-concentration methanol within the fuel cartridge 43 is pumped into the mixing tank 45 by the fuel supply pump 44. The high-concentration methanol within the mixing tank 45 is mixed with and diluted by water and low-concentration methanol from the fuel electrode 47 (i.e., the remainder left from the electricity generating reaction), thereby resulting in low-concentration methanol. The concentration of the low-concentration methanol is controlled so that a concentration with high electricity generating efficiency can be attained (e.g., 3 to 6% by mass). This control can be realized by controlling the amount of high-concentration methanol supplied to the mixing tank 45 by the fuel supply pump 44, or by controlling the amount of water circulating to the mixing tank 45 with the water collection pump 56 and the like, based on the information of a concentration sensor 60.

The water solution of methanol, diluted in the mixing tank 45, is compressed by the feed pump 46, and is injected to the fuel electrode (negative electrode) 47 of the DMFC stack 42. At the fuel electrode 47, electrons are generated by the oxidization reaction of the methanol. Hydrogen ions ($H^+$) permeate the solid polymer electrolytic membrane 42$a$ within the DMFC stack 42, and reach the air electrode (positive electrode) 52.

On the other hand, carbon dioxide generated by the oxidization reaction occurring at the fuel electrode 47 circulates back to the mixing tank 45 again with the water solution of methanol not used for reaction. The carbon dioxide vaporizes within the mixing tank 45, heads to the condenser 53 via the mixing tank valve 48, and ultimately is externally vented from the vent 58 through the vent valve 57.

Now, the flow of air (oxygen) is as follows. Air is taken in from an air intake 49, compressed by an air feed pump 50, and injected to the air electrode (positive electrode) 52 by the air feed valve 51. At the air electrode 52, reduction reaction of oxygen ($O_2$) progresses, and water ($H_2O$) is generated as vapor from electrons ($e^-$) from external load, the hydrogen ions ($H^+$) from the fuel electrode 47, and the oxygen ($O_2$). This vapor is discharged from the air electrode 52, and reaches the condenser 53. At the condenser 53, the vapor is cooled by a cooling fan 54 and becomes water (liquid), and is temporarily stored in the water collection tank 55. The collected water is circulated to the mixing tank 45 by the water collection pump 56, thus completing the dilution-recirculation system 62 for diluting high-concentration methanol.

As can be understood from the electricity generating mechanism of the fuel cell unit 10 using the dilution-recirculation system 62 described above, auxiliaries 63 such as the pumps 44, 46, 50, and 56, valves 48, 51, 57, cooling fan 54, and so forth, are driven in order to obtain electric power from the DMFC stack 42, i.e., to start electric power generation. Thus, the water solution of methanol and the air (oxygen) are injected into the DMFC stack 42, where the electrochemical reaction progresses, thereby yielding electric power. On the other hand, generation of electricity can be stopped simply by not driving the auxiliaries 63.

Figure 4:
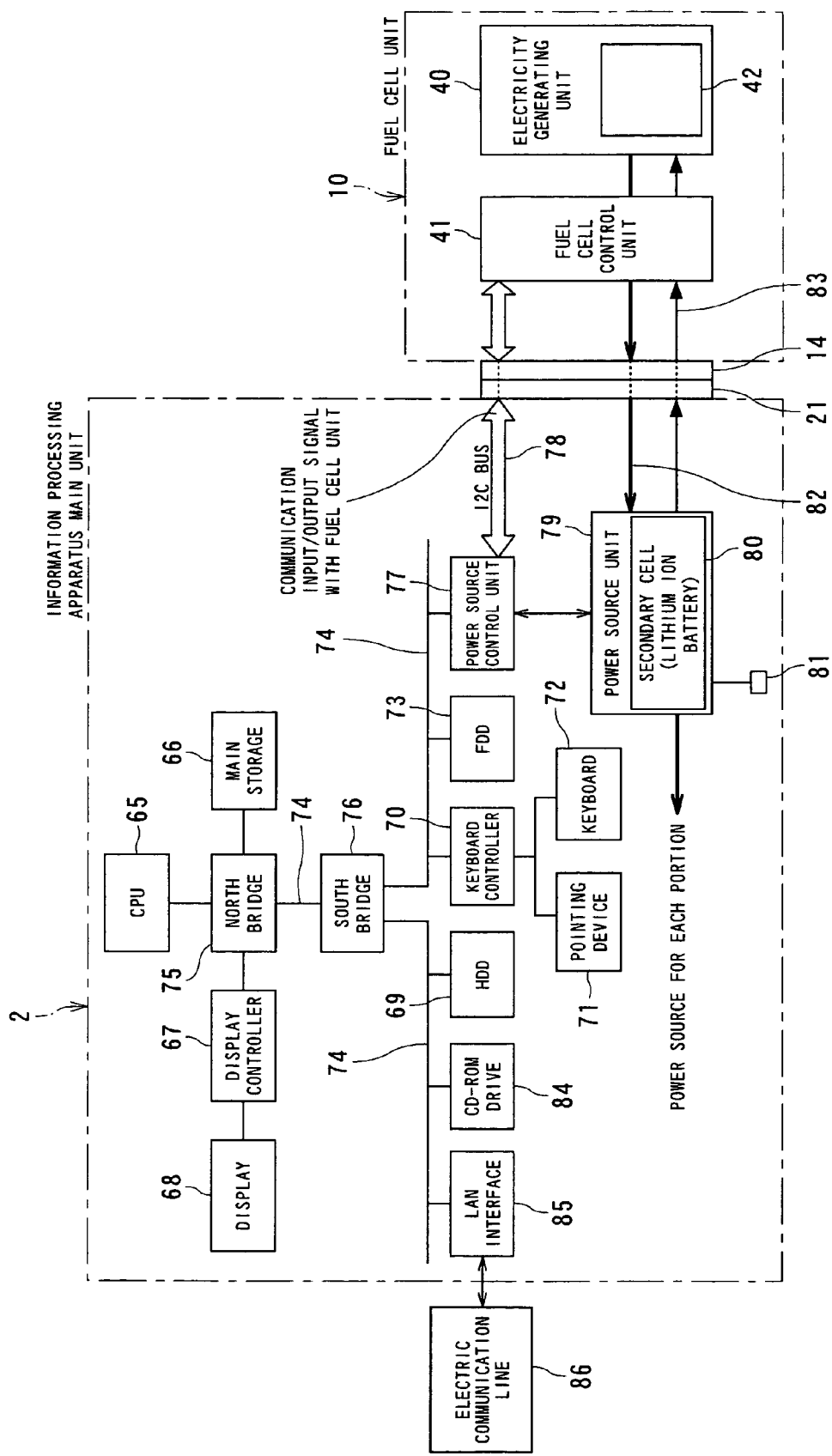
FIG. 4 is a diagram illustrating the information processing apparatus, and in particular the configuration of an information processing apparatus main unit.

FIG. 4 is a diagram illustrating the system configuration wherein the fuel cell unit 10 is connected to the information processing apparatus main unit 2 via the docking connectors 14 and 21.

The information processing apparatus main unit 2 comprises a CPU 65, main storage 66, display controller 67, display 68, HDD (Hard Disk Drive) 69, keyboard controller 70, pointing device 71, keyboard 72, FDD (Floppy Disk Drive) 73, CD-ROM driver 84, LAN interface 85, a bus 74 for transmitting signals between the above components, and devices called North Bridge 75 (also known as a system controller) and South Bridge 76 (also known as a peripheral controller) for converting signals transmitted by the bus 74.

Also, a power source unit (a electric power supply unit) 79 is provided within the information processing apparatus main unit 2, and a lithium ion battery for example is kept here as a secondary cell 80. The power source unit 79 is controlled by a control unit 77 (hereafter referred to as "power source control unit 77").

Two electrical interfaces are provided between the fuel cell unit 10 and the information processing apparatus main unit 2; a control system interface, and a power source system interface. The control system interface is an interface provide for communication between the power source control unit 77 of the information processing apparatus main unit 2 and the fuel cell control unit 41 of the fuel cell unit 10. Communication carried out between the information processing apparatus main unit 2 and the fuel cell unit 10 via the control system interface is performed over a serial bus such as an I2C (Inter-IC) bus 78, for example.

The power source system interface is an interface provided for transferring electric power between the fuel cell unit 10 and the information processing apparatus main unit 2. For example, electric power generated by the DMFC stack 42 of the electricity generating unit 40 is supplied to the information processing apparatus main unit 2 via the fuel cell control unit 41 and the docking connectors 14 and 21. Also, the power source system interface also supplies electric power from the power source unit 79 of the information processing apparatus main unit 2 to the auxiliaries 63 within the fuel cell unit 10 (this supply of power is denoted by reference numeral 83 in the drawing).

DC power which has been subjected to AC/DC conversion is supplied to the power source unit 79 of the information processing apparatus main unit 2 via an AC adapter connector 81, whereby the information processing apparatus main unit 2 can be operated and the secondary cell (lithium ion battery) 80 can be charged.

Figure 5:
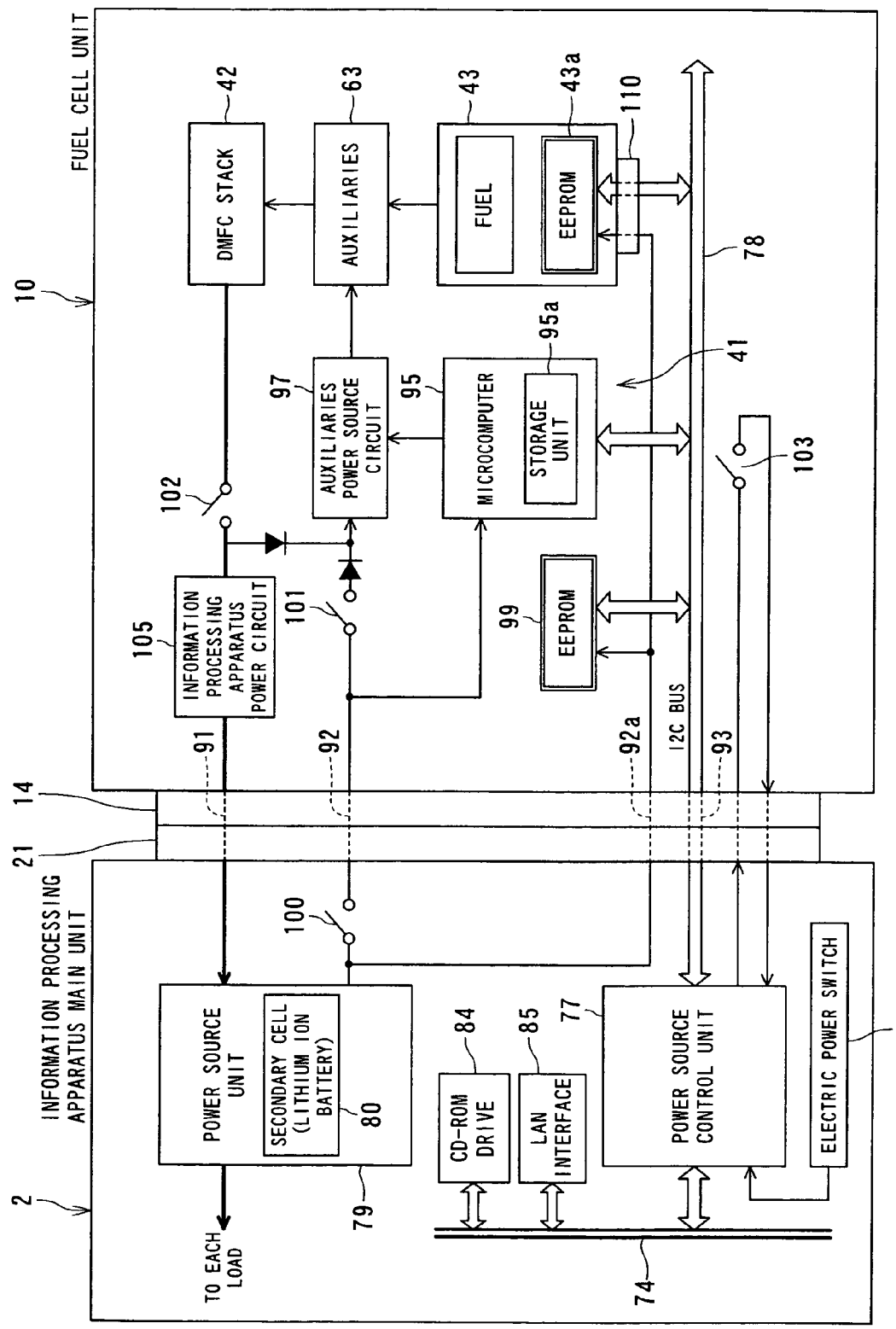
FIG. 5 is a diagram illustrating a function system for updating control programs for the information processing apparatus.

FIG. 5 illustrates the function system of the fuel cell control unit 41 of the fuel cell unit 10 and the power source unit 79 of the information processing apparatus main unit 2 in one embodiment.

The fuel cell unit 10 and the information processing apparatus main unit 2 are mechanically and electrically connected by the docking connectors 14 and 21. The docking connectors 14 and 21 have a first power source terminal (output power source terminal) 91 for supplying electric power generated at the DMFC stack 42 of the fuel cell unit 10 to the information processing apparatus main unit 2, a second power source terminal (input power source terminal for auxiliaries) 92 for supplying electric power from the information processing apparatus main unit 2 to the micro-computer 95 of the fuel cell unit 10 and also supplying electric power to an auxiliaries power source circuit 97 via a switch 101, and further, a third power source terminal 92a for supplying power from the information processing apparatus main unit 2 to EEPROM 99 and to EEPROM 43a built into the fuel cartridge 43.

The micro-computer 95 has a built-in storage unit 95a for storing control programs, control data, etc., and has a storage unit 95a configured of flash memory or the like.

The EEPROM 99 stores identification information of the fuel cell unit 10 for example, and is configured of electronically-writable non-volatile memory. The EEPROM 43a of the fuel cartridge 43 stores, for example, information indicating the type of fuel stored in the fuel cartridge 43 and the like, and is also configured of electronically-writable non-volatile memory.

Further, the docking connectors 14 and 21 have a communication input/output terminal 93 for communication between the power source control unit 77 of the information processing apparatus main unit 2 and the micro-computer 95 of the fuel cell unit 10, and for communication with the EEPROM 99 and EEPROM 43a.

Figure 6:
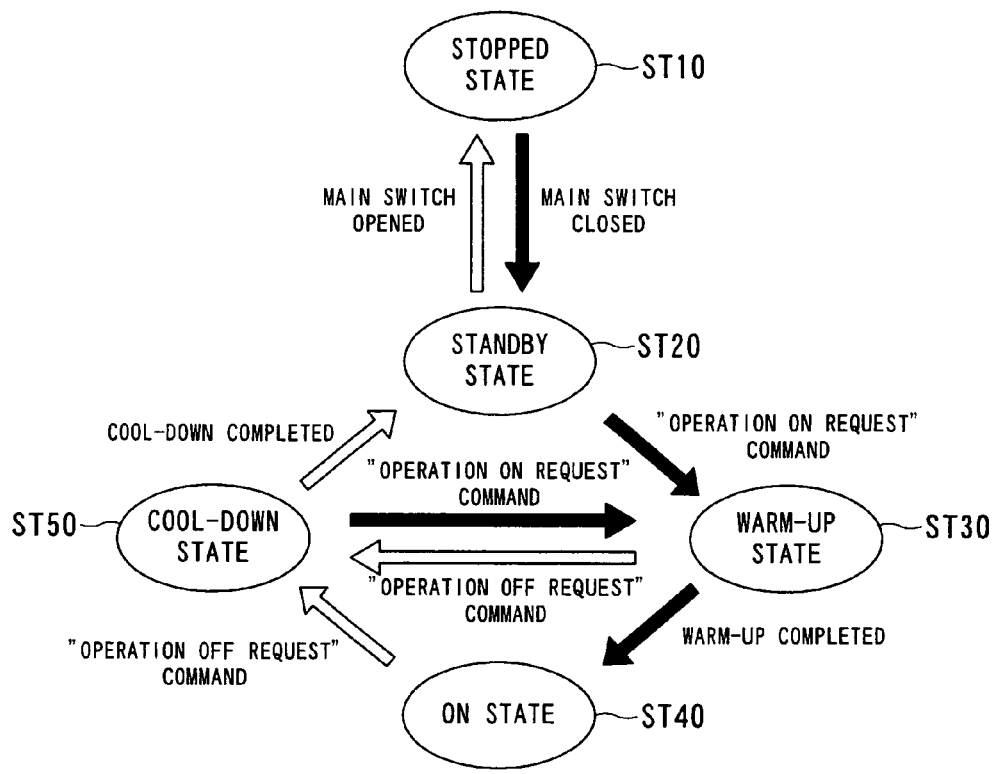
FIG. 6 is a diagram illustrating the basic state transition of the fuel cell unit.

FIG. 6 illustrates the transition of the state of the fuel cell unit 10 in an electricity generation starting sequence and an electricity generation stopping sequence. State transition will be described with reference to the system diagram in FIG. 5 and this FIG. 6. Note that in FIG. 5, the secondary cell (lithium ion battery) 80 of the information processing apparatus main unit 2 is charged with a predetermined electric power. Also, all the switches shown in FIG. 5 should be understood to be open.

(1) "Stopped State" ST10: This is a state wherein the information processing apparatus main unit 2 and the fuel cell unit 10 are connected, but no electricity is being provided to the micro-computer 95 or auxiliaries 63 provided to the fuel cell unit 10, and no electricity is being generated at the DMFC stack 42. However, electric power is supplied to the EEPROM 99 and EEPROM 43a via the third power source terminal 92a.

(2) "Standby State" ST20: Upon a main switch 103 provided to the fuel cell unit 10 side being closed, the power source control unit 77 of the information processing apparatus main unit 2 recognizes that generating electricity at the fuel cell unit 10 has been permitted. This main switch 103 is a slide switch or the like, for example. Upon detecting the main switch 103 closing, the power source control unit 77 reads out the identification information of the fuel cell unit 10 stored in the EEPROM 99, and the fuel type information, for example, stored in the EEPROM 43a, via the I2C bus 78. In the event that determination is made at the power source control unit 77 that the identification information and fuel type information that has been read out is suitable, the power source control unit 77 closes a switch 100 provided to the information processing apparatus main unit 2, so as to supply electric power of the secondary cell 80 to the micro-computer 95. This state is the "Standby State" ST20. In the "Standby State" ST20, the micro-computer 95 becomes operative, but no power is supplied to the auxiliaries 63, and no electricity is being generated at the DMFC stack 42.

(3) "Warm-up State" ST30: The power source control unit 77 gives a "operation ON request" command to the micro-computer 95 via the I2C bus 78 to start electric power generation, and the micro-computer 95 closes the switch 101 provided to the fuel cell unit 10 upon receiving this command. Consequently, the electric power of the secondary cell 80 of the information processing apparatus main unit 2 is input to the auxiliaries power source circuit 97, and driving of the auxiliaries 63 is started by power being supplied to the auxiliaries 63.

Once driving of the auxiliaries 63 starts, fuel and air is supplied to the DMFC stack 42, whereby generating electricity at the DMFC stack 42 starts.

Further, the micro-computer 95 closes a switch 102 provided to the fuel cell unit 10, and starts supply of the generated electric power following converting to a predetermined voltage at an information processing apparatus electric power circuit 105. It should be noted, however, that the output of generated electricity does not reach the rated value instantaneously, so the state until reaching the rated value is called the "Warm-up State" ST30.

This "operation ON request" command is transmitted to the micro-computer 95 from the power source control unit 77 in the event that the information processing apparatus main unit 2 is started up, for example. Specifically, the power source control unit 77 starts up the information processing apparatus main unit 2 upon the power source control unit 77 detecting the user pressing an electric power switch 104 provided to the information processing apparatus main unit 2, and also transmits the "operation ON request" command to the micro-computer 95 of the fuel cell unit 10.

(4) "On State" ST40: The micro-computer 95 determines whether the output of the DMFC stack 42 has reached the rated value by, for example, monitoring the output voltage of the DMFC stack 42 and the temperature of the DMFC stack 42, and upon determining that the output of the DMFC stack 42 has reached the rated value, opens the switch 101 of the fuel cell unit 10, and switches electric power supply to the auxiliaries 63 from electric power supply from the information processing apparatus main unit 2 to electric power supply from the DMFC stack 42. This state is the "On State" ST40.

The above-described is the basic flow from the "Stopped State" ST10 to the "On State" ST40, with the "On State" ST40 being the normal electricity generating state of the fuel cell unit 10.

(5) "Cool-down State" ST50: In the event that the fuel cell unit 10 is in the "On State" ST40 or "Warm-up State" ST30, and the power source control unit 77 transmits an "operation OFF request" command to the micro-computer 95 of the fuel cell unit 10 to stop electric power generation, the state of the fuel cell unit 10 makes transition to the "Cool-down State" ST50. the processing of the "Cool-down State" ST50 is as follows.

First, the micro-computer 95 closes the switch 101 of the fuel cell unit 10, thereby switching the electric power source of the auxiliaries power source circuit 97 used for driving the auxiliaries 63 to the secondary cell 80 supplied via the first power source terminal 92.

Further, the micro-computer 95 opens the switch 102 of the fuel cell unit 10, thereby stopping supply of electric power generated at the DMFC stack 42 to the information processing apparatus main unit 2.

Next, the micro-computer 95 stops the air feed pump 50, but leaves the fluid feed pump 46 operating for a predetermined amount of time. This pump operation enables bubbles of carbon dioxide adhering in the liquid transporting channel within the fuel electrode 47 to be washed out and removed.

Next, the micro-computer 95 stops the fluid feed pump 46 and runs the air feeds pump at maximum capability, which is continued for a predetermined amount of time. This pump operation enables droplets adhering in the air transporting channel within the air electrode 47 to be blown out and removed. Automatically washing or blowing out and removing bubbles and droplets generated by the electric power generation of the DMFC stack in the stopping sequence can improve the electricity generating efficiency the next time that electricity generating is started.

Subsequently, the vent valve 57 and air feed valve 51 are closed, to prevent foreign material such as dust and the like in the ambient atmosphere of the fuel cell unit 10 from entering, and preventing the liquid fuel set in the fuel cell unit 10 from leaking. Further, the micro-computer 95 stops supply of electric power from the auxiliaries power source circuit 97 to the auxiliaries 63.

The above is the processing of the "Cool-down State" ST50 performed at the fuel cell unit 10. The processing of the "Cool-down State" ST50 is carried out for around 30 seconds, for example. Following the cool-down processing ending, the switch 101 of the fuel cell unit 10 is opened so as to stop the driving of the auxiliaries 63, and the state returns to the "Standby State" ST20.

Figure 7:
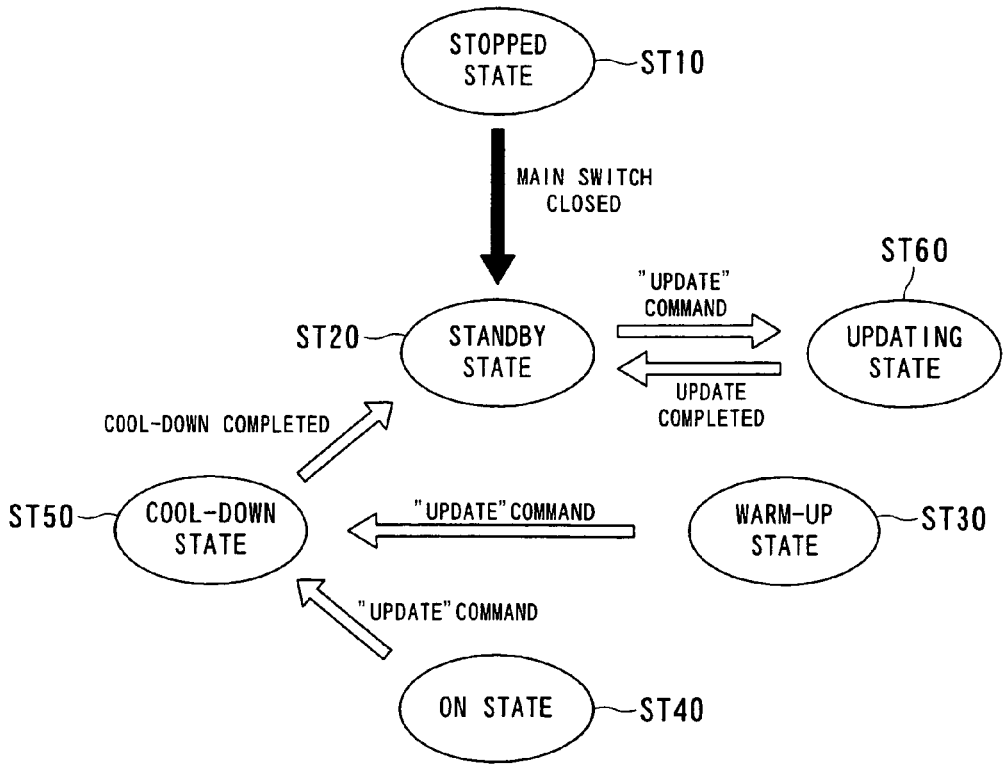
FIG. 7 is a diagram illustrating the state transition of the fuel cell unit at the time of updating the control program.

FIG. 7 is a diagram illustrating the state transition in a case of updating the control program 95b stored in the storage unit 95a of the micro-computer 95, for example. Updating of the control program 95b is performed in an "Updating State" ST60 shown in FIG. 7. Transition to the "Updating State" ST60 is performed by an "Update" command from the power source control unit 77 provided to the information processing apparatus main unit 2 being received by the micro-computer 95.

In the event that the state of the fuel cell unit 10 is in the "Standby State" ST20, the state of the fuel cell unit 10 can make transition to the "Updating State" ST60. In the event that the state of the fuel cell unit 10 is in the "Stopped State" ST10, turning on the main switch 103 of the fuel cell unit 10 effects transition to the "Standby State" ST20. In the event that the state of the fuel cell unit 10 is in the "Standby State" ST20, and the micro-computer 95 receives an "Update" command, the state makes transition to the "Updating State" ST60.

On the other hand, in the event that the state of the fuel cell unit 10 is in the "On State" ST40 or "Warm-up State" ST30, and the micro-computer 95 receives an "Update" command, the state of the fuel cell unit 10 makes transition to the "Cool-down State" ST50. In the "Cool-down State" ST50, the fuel cell unit 10 is subjected to cool-down processing for a predetermined amount of time, and then makes transition to the "Standby State" ST20. The reason that the fuel cell unit 10 performs the cool-down processing is in order to improve the electricity generating efficiency for starting generation of electricity the next time.

Figure 8:
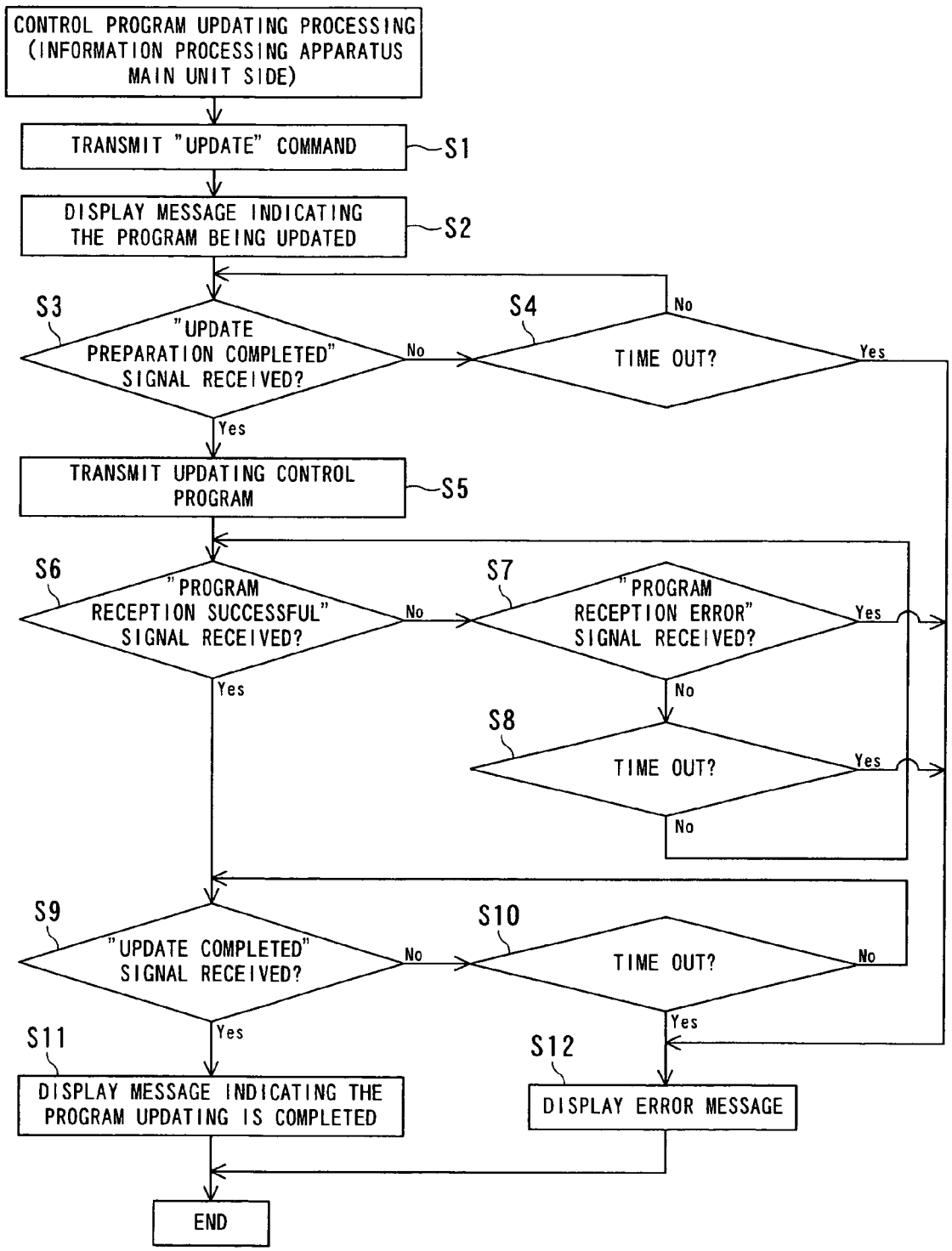
FIG. 8 is a diagram illustrating an example of the flow of processing for control program updating (at the information processing apparatus main unit side)
Figure 9A:
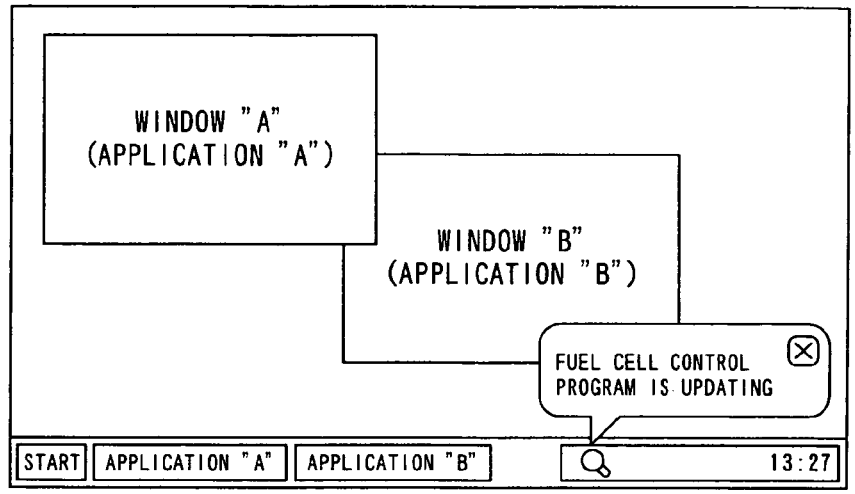
FIGS. 9A through 9C are diagrams illustrating examples of a display screen of the information processing apparatus.

FIG. 8 is a flowchart describing the procedures for control program updating processing (at the information processing apparatus main unit 2 side). First, the power source control unit 77 transmits an "Update" command to the micro-computer 95 provided to the fuel cell unit 10 (S1). Further, a display is made on the display 68 of the panel unit 4 of the information processing apparatus main unit 2 to the effect that the control program 95b is being updated, for further ease-of-use for the user (S2). FIG. 9A is a diagram illustrating a display example on the display 68.

Upon the micro-computer 95 receiving an "update" command, a signal indicating that the state of the fuel cell unit 10 is the "Standby State" ST20, i.e., a signal indicating that preparation of program updating has been completed (hereafter referred to as "update preparation completed" signal), is transmitted to the power source control unit 77. Also, upon the micro-computer 95 receiving an "update" command from the power source control unit 77, the state of the fuel cell unit 10 makes transition to the "Updating State" ST60. Subsequently, the power source control unit 77 transmits an updating control program 95c to the micro-computer 95.

Now, the updating control program 95c to be transmitted to the micro-computer 95 needs to have been input to the information processing apparatus main unit 2. Various methods may be conceived for inputting the updating control program 95c to the information processing apparatus main unit 2, such as inputting the updating control program 95c from an electric communication line 86 (e.g., the Internet, etc.) via the LAN interface 85 shown in the system configuration diagram in FIG. 4, inputting the updating control program 95c stored in a CD-ROM via the CD-ROM driver 84, and so forth. The method for inputting the updating control program 95c to the information processing apparatus main unit 2 is not restricted to any of the above methods, and other data input methods which the information processing apparatus main unit 2 has may be applied.

Figure 9B:
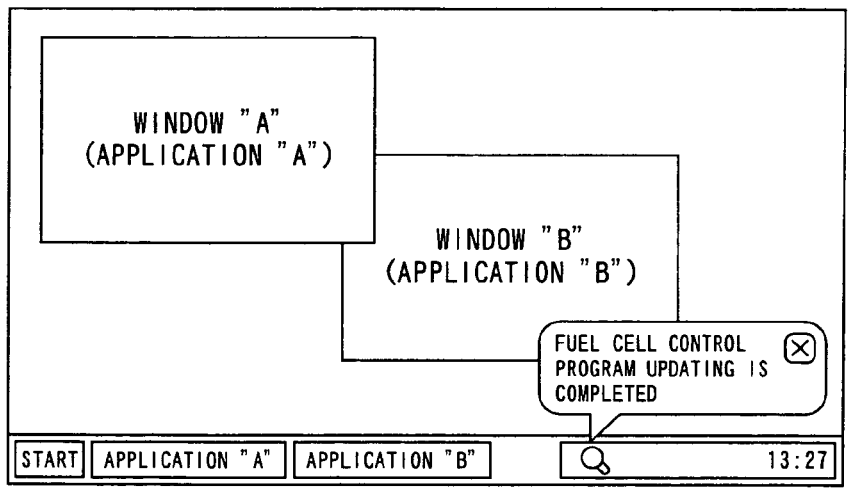
Figure 9C:
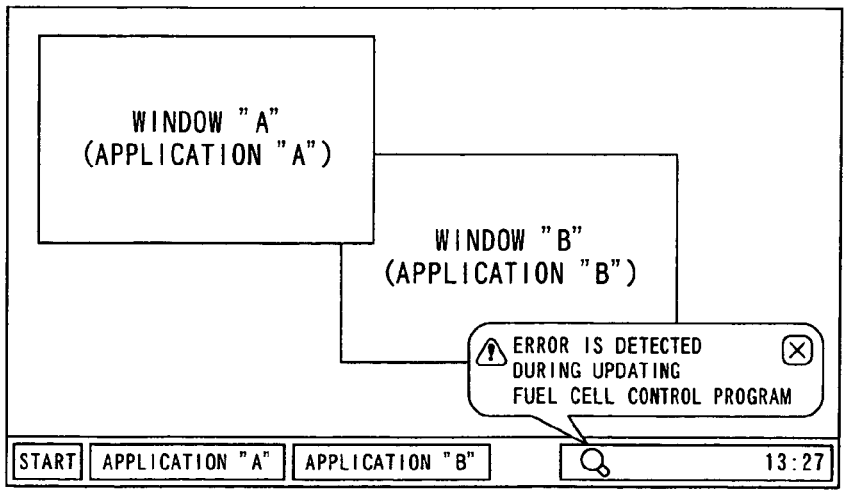

In the event that the power source control unit 77 does not receive the "update preparation completed" signal within a predetermined amount of time, this is determined to be timeout (yes in S4), and an error message is displayed on the display 68. The contents of the displayed message are as shown in FIG. 9C, for example. On the other hand, in the event that the power source control unit 77 receives the "update preparation completed" signal within a predetermined amount of time (yes in S3), and the power source control unit 77 transmits the updating control program 95c to the micro-computer 95 (S5).

Next, the power source control unit 77 determines whether or not a "program reception successful" signal transmitted from the micro-computer 95 has been received (S6). This "program reception successful" signal is information indicating that the micro-computer 95 has successfully received the updating control program 95c.

Upon the power source control unit 77 receiving the "program reception successful" signal (yes in S6), the power source control unit 77 determines whether or not a "update completed" signal transmitted from the micro-computer 95 has been received (S9). This "update completed" signal is information indicating that the updating control program 95c has been successfully updated at the micro-computer 95.

Upon the power source control unit 77 receiving the "update completed" signal (yes in S9), a message indicating the updating of the updating control program 95c at the fuel cell unit 10 side has been completed (e.g., FIG. 9B) is displayed on the display 68 (S11). Subsequently, the control program updating processing ends.

On the other hand, in the event that the power source control unit 77 does not receive a "program reception successful" signal (no in S6), but rather receives a "program reception error" signal (yes in S7), an error message is displayed on the display 68 (e.g., FIG. 9C) (S12). Subsequently, the control program updating processing ends. This "program reception error" signal is information indicating that the micro-computer 95 has not successfully received the updating control program 95c.

Further, in the event that the power source control unit 77 receives neither of the "program reception successful" signal and the "program reception error" signal within the predetermined amount of time (time-out) (yes in S8), an error message is displayed on the display 68 (S12), and subsequently, the control program updating processing ends. Moreover, in the event that the power source control unit 77 does not receive the "update completed" signal within the predetermined amount of time (yes in S10), an error message is displayed on the display 68 (S12), and subsequently, the control program updating processing ends.

Figure 10:
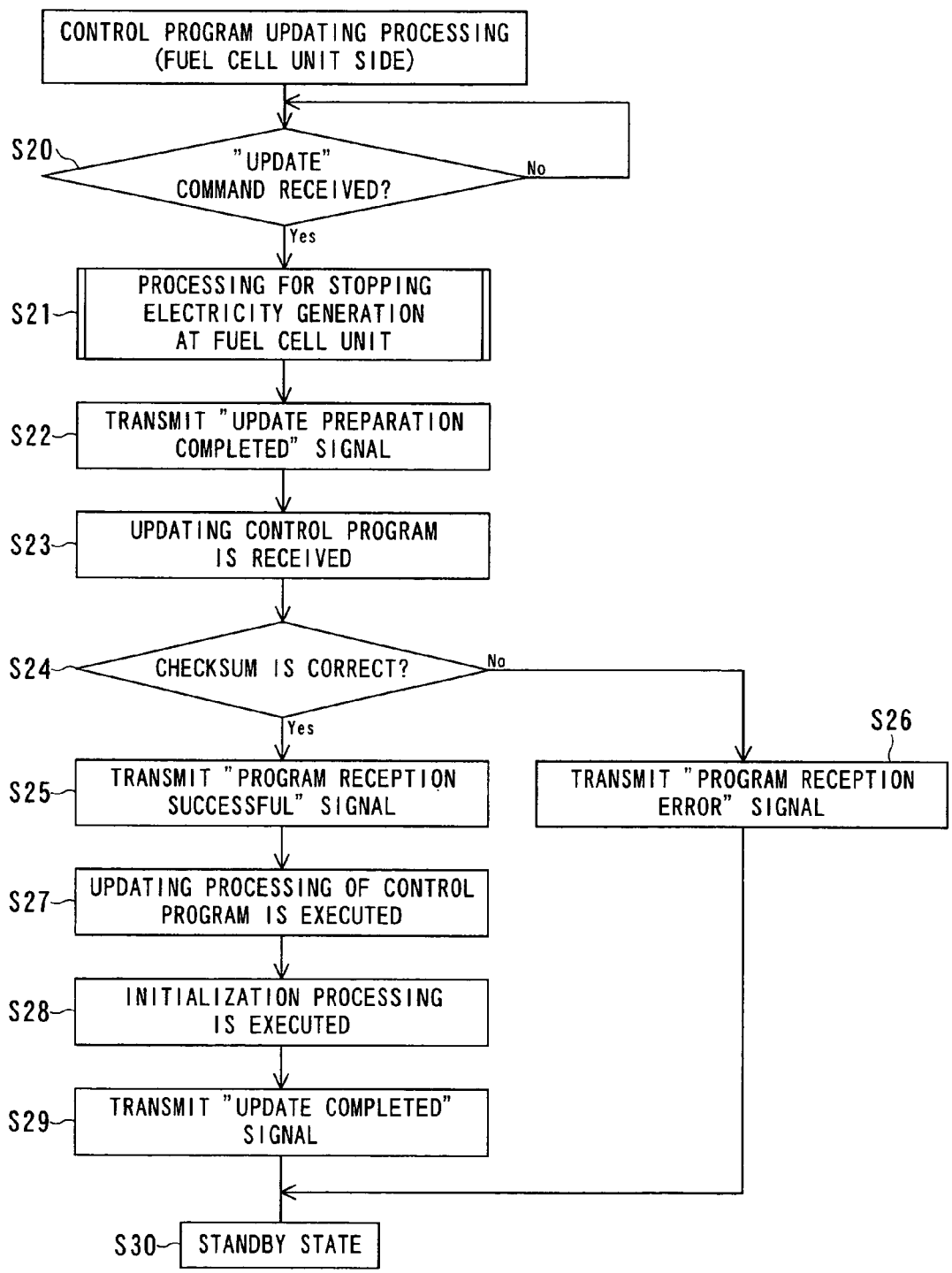
FIG. 10 is a diagram illustrating an example of the flow of processing for control program updating (at the fuel cell unit side)

FIG. 10 is a flowchart illustrating the control program updating processing procedures at the fuel cell unit 10. First, the micro-computer 95 determines whether or not an "update" command has been received from the power source control unit 77 (S20). In the event that the micro-computer 95 has received the "update" command (yes in S20), the micro-computer 95 executes processing for stopping electricity generating being performed at the fuel cell unit 10 (S21).

Figure 11:
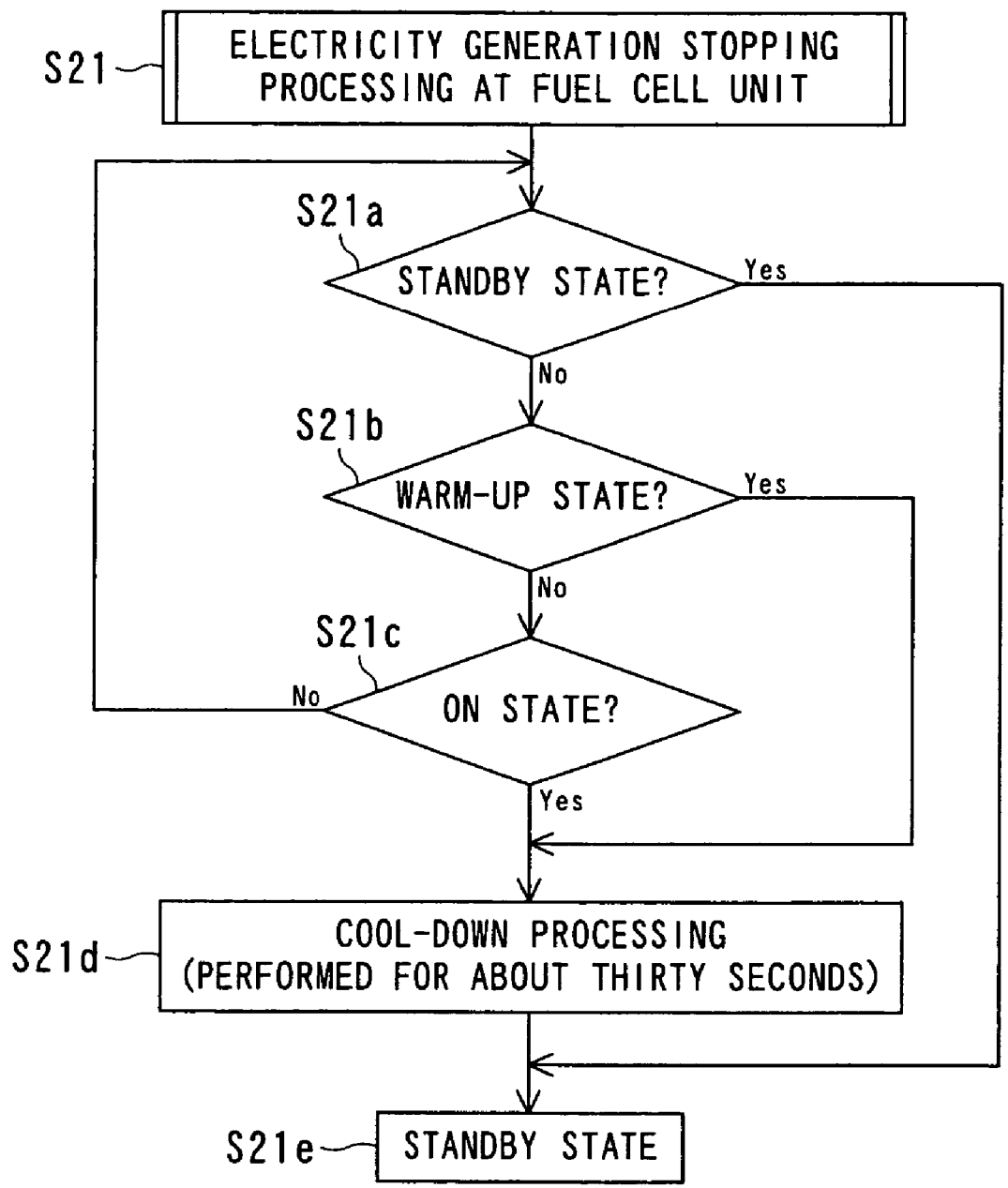
FIG. 11 is a diagram illustrating an example of the flow of processing for stopping of electric power generation of the fuel cell unit.

FIG. 11 illustrates the details of electricity generation stopping processing performed at the fuel cell unit 10 in step S21.

In steps S21a through S21c shown in FIG. 11, the micro-computer 95 determines whether the state of the fuel cell unit 10 is one of the "Standby State" ST20, "Warm-up State" ST30, or "On State" ST40.

In the event that the state of the fuel cell unit 10 is the "Standby State" ST20 (yes in S21a), this state is maintained (S21e).

In the event that the state of the fuel cell unit 10 is the "Warm-up State" ST30 (yes in S21b), or the "On State" ST40 (yes in S21c), transition is made to the "Cool-down State" ST50, where cool-down processing is performed (S21d). Subsequently, transition is made to the "Standby State" ST20 (S21e).

In this way, regardless of the sate of the fuel cell unit 10 at the time of receiving the updating command, transition is made to the "Standby State" ST20 due to the electricity generating stopping processing (S21) of the fuel cell unit 10. After this transition to the "Standby State" ST20 (S21 in FIG. 10), the micro-computer 95 transmits an "update preparation completed" signal to the power source control unit 77 (S22). Subsequently, the updating control program 95c transmitted from the power source control unit 77 is received (S23).

The micro-computer 95 determines whether or not the updating control program 95c transmitted from the power source control unit 77 has been successfully received using a checksum, for example (S24). A checksum is one type of error detection used for exchanging data. The data is divided into blocks of a predetermined length before transmission, the data within each block is taken as a numerical value, and the sum thereof is called a checksum. The obtained checksum is transmitted along with the data. That receiving side calculates the checksum in the same way from the transmitted data string, and checks whether or not the check sum matches that transmitted. In the event that there is a discrepancy, determination is made that there has been an error in the communication path.

In the event that the checksum is correct, the micro-computer 95 transmits the "program reception successful" signal to the power source control unit 77 (S25). Subsequently, the control program 95b (old program) stored in the storage unit 95a of the micro-computer 95 is updated with the updating control program 95c (new program) transmitted from the power source control unit 77 of the information processing apparatus main unit 2 (S27).

Further, initialization of the updating control program 95c to the predetermined data region is executed, thereby enabling execution of the updating control program 95c (S28).

Subsequently, an "update completed" signal indicating that updating processing has been completed is transmitted to the power source control unit 77 (S29). Following transmission of the "update completed" signal, the state of the fuel cell unit 10 returns to the "Standby State" ST20 (S30), and the control program updating processing ends.

On the other hand, in the event that a checksum error has been determined, a "program reception error" is transmitted to the power source control unit 77 (S26), following which the state of the fuel cell unit 10 returns to the "Standby State" ST20 (S30), and the control program updating processing ends.

The control program updating processing of the fuel cell unit 10 of the embodiment described above has the following advantages.

(1) The updating control program 95c can be transmitted to the micro-computer 95 provided in the fuel cell unit 10 using the data bus (e.g., I2C bus) of the information processing apparatus 1, so a cable interface for writing new data is unnecessary.

(2) Input of the updating control program 95c can be easily made to the information processing apparatus main unit 2 with the LAN interface 85 or CD-ROM driver 84 or the like of the information processing apparatus main unit 2.

(3) Update commands can be transmitted by operating the information processing apparatus main unit 2, so updating progressing of control programs can be automatically performed by this update command transmission alone.

(4) In the event that the fuel cell unit 10 is generating electricity, this can be automatically stopped and power necessary for carrying out the updating processing of the control program can be automatically supplied from the information processing apparatus main unit 2 to the fuel cell unit 10.

These and other highly advantageous features provide an easy-to-use and convenient information processing apparatus, and control method for the information processing apparatus.

It should be understood that the present invention is by no means restricted to the above-described embodiments; rather, in carrying out the invention, various alterations and modifications may be made with regard to the components without departing from the spirit and scope of the present invention. Further, various arrangements may be made within the scope of the present invention by arranging the components in various ways, or by omitting one or more of the components. Moreover, arrangements obtained by suitably combining the components of the above-described embodiments with components of other embodiments according to the present invention are also encompassed by the present invention.

What is claimed is:

1. An information processing apparatus connectable to a fuel cell unit, the fuel cell unit including a fuel cell, a storage unit storing a first program, and a fuel cell control unit, the information processing apparatus comprising:
   an input unit for externally inputting a second program;
   a control unit for performing communication with the fuel cell unit; and
   a secondary cell;
   wherein the second program is transmitted to the fuel cell unit; and the first program is undated with the second program when the fuel cell control unit is in a standby state and operative with electric power supplied from the secondary cell.

2. An information processing apparatus according to claim 1, wherein the second program is a program to be used for control performed at the fuel cell unit.

3. An information processing apparatus according to claim 1, wherein the second program is a program to be executed by the fuel cell control unit.

4. An information processing apparatus according to claim 1, wherein the control unit stops generation of an electric power by the fuel cell and transmits the second program to the fuel cell unit.

5. An information processing apparatus according to claim 1, wherein the second program is stored in the storage unit in a state in which generation of an electric power is stopped.

6. An information processing apparatus according to claim 1, further comprising an electric power supply unit which supplies electric power to the fuel cell unit, wherein the electric power supply unit supplies electric power to the fuel cell unit when the second program is transmitted to the fuel cell unit.

7. An information processing apparatus according to claim 1, further comprising a display unit;
wherein the display unit displays states of processing which stores the second program in the storage unit.

8. A fuel cell unit connectable to an external apparatus having a secondary cell, the fuel cell unit comprising:
a fuel cell for generating electricity;
a storage unit storing a first program; and
a control unit for receiving a second program transmitted from the external apparatus and used for control of the fuel cell unit,
wherein the first program is undated with the second program when the control unit is in a standby state and operative with electric power supplied from the secondary cell.

9. A fuel cell unit according to claim 8, wherein the control unit executes the second program.

10. A fuel cell unit according to claim 8,
wherein the control unit stores the second program in the storage unit in a state in which generation of electric power by the fuel cell is stopped.

11. A fuel cell unit according to claim 8, wherein the control unit is supplied with electric power from the external apparatus when the control unit receives the second program.

12. A fuel cell unit according to claim 8, wherein the control unit notifies the external apparatus of states of processing which stores the second program in the storage unit.

13. A method for updating a program used for controlling a fuel cell unit, the fuel cell unit including a storage unit storing a first program and a control unit, the fuel cell unit being capable of communicating with an information processing apparatus, the method comprising:
inputting externally a second program used for controlling the fuel cell unit to the information processing apparatus;
transmitting the second program from the information apparatus to the fuel cell unit; and
updating the first program with the second program when the control unit is in a standby state and operative with electric power supplied from a secondary cell in the information processing apparatus.

14. A method according to claim 13, wherein the second program is a program executed by the control unit in the fuel cell unit.

15. A method according to claim 13, wherein the second program is transmitted after generation of electric power by the fuel cell unit is stopped.

16. A method according to claim 13, wherein the second program is stored in the storage unit after generation of electric power by the fuel cell unit is stopped.

17. A method according to claim 13, wherein the information processing apparatus supplies electric power to the fuel cell unit when the second program is transmitted to the fuel cell unit.

18. A method according to claim 13, wherein a display unit provided in the information processing apparatus displays states of processing which stores the second program in the storage unit.

* * * * *

UNITED STATES PATENT AND TRADEMARK OFFICE
CERTIFICATE OF CORRECTION

| | | |
|---|---|---|
| PATENT NO. | : 7,620,805 B2 | Page 1 of 1 |
| APPLICATION NO. | : 11/528559 | |
| DATED | : November 17, 2009 | |
| INVENTOR(S) | : Ninomiya | |

It is certified that error appears in the above-identified patent and that said Letters Patent is hereby corrected as shown below:

Title page, below Item (65), insert:

--(63) Related U.S. Application Data,

Continuation of PCT International Application No. PCT/JP2005/005275, filed March 23, 2005-- and

--(30) Foreign Application Priority Data,

Mar. 31, 2004 (JP)...........2004-108044--.

Signed and Sealed this

Second Day of March, 2010

David J. Kappos
*Director of the United States Patent and Trademark Office*